United States Patent Office 3,125,517
Patented Mar. 17, 1964

3,125,517
INVERT EMULSION DRILLING FLUID
Ronald L. Voda, Southgate, Mich., assignor to Wyandotte Chemicals Corporation, Wyandotte, Mich., a corporation of Michigan
No Drawing. Filed Nov. 10, 1960, Ser. No. 68,336
25 Claims. (Cl. 252—8.5)

This invention relates to drilling fluids employed in the drilling of oil and gas wells. More particularly it relates to emulsion drilling fluids of the water-in-oil type.

During the drilling of oil and gas wells drilling fluid is circulated down through the interior of the drill pipe and then back up to the surface through the annulus between the drill pipe and the wall of the bore hole. The drilling fluid has various functions including those of lubricating the drill bit and pipe, carrying cuttings from the bottom of the well bore hole to the surface of the ground, and imposing a hydrostatic head on the drilled formation to prevent the escape of oil, gas, or water into the well bore hole during the drilling operations.

Within recent years water-in-oil emulsions, in which droplets of water are dispersed in the continuous phase of oil, have been developed for use in drilling oil and gas wells. In preparing and employing these emulsions, however, several difficulties have been encountered. One of the principal difficulties arises from water contamination, which almost invariably occurs during drilling operations. The contaminating water produces a change in the water-to-oil ratio in the emulsion which often causes instability or even inversion of the emulsion. This undesirable condition can be partially avoided by using emulsions containing more water than oil. However, few emulsifiers effectively form water-in-oil emulsions with more water than oil.

If a water-in-oil emulsion contains a high percentage of oil and little water, the density will approach that of the oil. Thus, weighting materials must be added to the oil to increase the drilling fluid density. However, the formation of a stable suspension of weighting materials in oil is not a simple matter. If, on the other hand, an emulsion could be prepared containing a high water concentration, then the density would be more nearly that of water and weighting material may not be necessary.

A high water content drilling fluid is also less expensive, less objectional to work with, and less flammable than a drilling fluid containing a low water content.

Another problem is contamination of the emulsion drilling fluid by salts in the formation, such as sodium chloride, calcium carbonate and calcium sulfate. These salts tend to break many emulsions. In some cases the salts react with the emulsifiers to precipitate the latter or otherwise render them ineffective.

Another consideration in the manufacture of drilling fluids is viscosity. High viscosity fluids are more desirable than high gel strength fluids to maintain cuttings in suspension when circulation is stopped in that excessive pump pressures are necessary to start circulation of fluids having high gel strength which may fracture a formation.

It is also desirable that emulsion drilling fluids contain a low concentration of emulsifying agent in that the emulsifying agent is a large contributor to the total cost of the drilling fluid.

However, emulsifiers with which drilling fluids containing the above properties can be prepared are rare in the art.

It is an object of the present invention to provide a water-in-oil emulsion drilling fluid having a high water content.

Another object of the present invention is to provide a high viscosity drilling fluid.

A further object of the present invention is to provide an emulsion drilling fluid which is stable when contaminated with sodium chloride, calcium carbonate, or calcium sulfate.

A still further object of this invention is to provide a stable water-in-oil emulsion drilling fluid which is inexpensive, nonflammable and unobjectionable to handle.

An additional object of this invention is to prepare a stable water-in-oil emulsion drilling fluid having the above desirable properties.

Another object of this invention is to provide a method of drilling or completing a well in which a drilling fluid, comprising a stable water-in-oil emulsion with desirable properties, is circulated.

I have discovered that the above objectives may be realized in a water-in-oil emulsion drilling fluid which has a pH within the range 5–8 by the use of an emulsifier system comprising two components, component A and component B. Component A is a monocarboxyl alkanoic, alkenoic, or alkynoic fatty acid containing from 2 to 22 carbon atoms, adipic acid, aromatic sulfonic acid, or boric acid, or mixtures thereof. Component B is a hydroxyethyl acetamide or ethoxylated hydroxyethyl acetamide of the general formula:

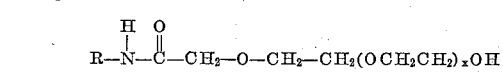

wherein R is an alkyl, alkenyl, or alkynl radical containing from 8 to 22 carbon atoms and x may be 0 or an integer not to exceed one-third the number of carbon atoms contained in R, and mixtures thereof. Ethoxylated amines of the general formula:

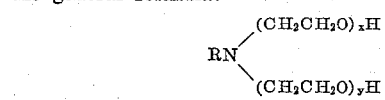

wherein R is an alkyl, alkenyl, or alkynl radical containing from 8 to 22 carbon atoms and where the total of x+y is an integer of at least 2 and not to exceed one-third the number of carbon atoms contained in R, and mixtures thereof, may also be used as component B. Component B may also be ethoxylated diamines of the general formula:

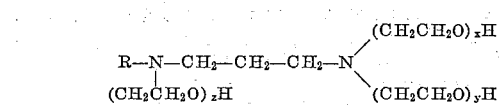

wherein R is an alkyl, alkenyl, or alkynl radical containing from 9 to 22 carbon atoms and where the total of x+y+z is an integer of at least 3 and not to exceed one-third the number of carbon atoms contained in R, and mixtures thereof, or sarcosinamides and ethoxylated sarcosinamides of the general formulae:

(a)
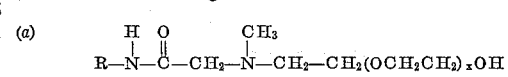

(b)
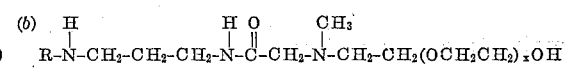

wherein R is an alkyl, alkenyl, or alkynl radical containing from 8 to 22 carbon atoms, and x may be 0 or an integer not to exceed one-third the number of carbon atoms contained in R, and mixtures thereof.

The previously disclosed compounds used as component B of the emulsifier system may be present individually or as mixtures of two or more of the compounds.

The drilling fluid on a basis of 100 parts by weight of drilling fluid is comprised of 70 to 95 parts by weight of water, 5 to 30 parts by weight of oil and 0.1 to 10 parts by weight of emulsifier.

The invert emulsion drilling fluid of this invention can be prepared having a high viscosity by using a high water concentration in the dispersed phase.

This fluid does not "flip" to an oil-in-water emulsion or break when prepared with a high water concentration or salt water or when a high solids concentration is present in the drilling fluid.

I have found that the viscosity of this type of drilling fluid can be adjusted to meet the required viscosity by either increasing the water concentration or the oil concentration. The viscosity is high enough to carry bit cuttings out of the well as well as to prevent cuttings from settling to the bottom of the well when drilling fluid circulation is stopped, making gel strength additives unnecessary. Due to the large amount of water the emulsion is nonflammable even though the continuous phase is oil. Since the oil phase concentration is very low the drilling fluid is clean, light colored and not sticky or otherwise objectionable to handle.

The stable invert emulsion drilling fluid composition of this invention may be used in a process for drilling or completing a well where the emulsion drilling fluid is circulated down through the interior of the drill pipe and then back up to the surface through the annulus between the drill pipe and the wall of the bore hole.

In order to demonstrate the invention more fully, a detailed description thereof appears below wherein the more important features are separately discussed.

OIL PHASE

The oil phase or continuous phase can comprise any mineral oil conventionally used in forming water-in-oil emulsion drilling muds. For example, diesel oil, crude oil, gas oil, kerosene and others are usable. The amount of oil used should be within the range of 5 to 30 parts by weight and preferably within the range 10 to 20 parts by weight, on the basis of 100 parts of the total drilling fluid composition. The high end of the broad range produces a very thin drilling fluid while the low end of the range produces a very viscous drilling fluid. The preferred range produces a medium to high viscosity fluid. The oil concentration depends upon the particular application for which the emulsion drilling fluid is to be used.

WATER PHASE

The water phase or dispersed phase of the emulsion can consist of fresh water, salt water, or sea water. The presence of sodium chloride, calcium carbonate, or calcium sulfate has no effect on the stability of the emulsion. The water concentration should be within the range of 70 to 95 parts by weight and preferably within the range of 80 to 90 parts by weight, on the basis of 100 parts of the total drilling fluid composition. The broad concentration range produces a thin to a very viscous invert drilling fluid while the preferred range produces a medium to high viscosity drilling fluid. The exact concentration depends upon the particular application for which the emulsion drilling fluid is to be used.

EMULSIFIER

The emulsifier of this invention is comprised of two components, component A and component B.

Component A is a naturally occurring or synthetically derived acid. I have found that numerous organic acids and one inorganic acid and mixtures of these acids may be used in this invention. The organic acids that can be used are the monocarboxyl alkanoic, alkenoic, or alkynoic fatty acids containing from 2 to 22 carbon atoms. Examples of this group of acids which can be used are: acetic, stearic, oleic, caproic, capric, butyric, behenic, palmitic, arachidic, myristoleic, palmitoleic, elaidic, linoleic, linolenic elaeostearic, and tarinic. Adipic acid, a member of the aliphatic dicarboxylic acids, has also been found suitable. Another suitable class of acids useful in this invention is the alkyl aryl and aliphatic sulfonic acids, for example p-toluenesulfonic, methanesulfonic, ethanesulfonic, propanesulfonic, pentanesulfonic, hexadecanesulfonic, 2 - naphthalene - methanesulfonic, and 1-6-naphthalenedisulfonic, ethylenesulfonic, benzenesulfonic, propyltoluenesulfonic, 1,2,4-triethylbenzenesulfonic, and 1,2,3,5 - tetramethylbenzenesulfonic. The inorganic acid found useful is boric acid.

Component B is a nitrogen containing compound, either an ethoxylated amine or amide, or may be an amide derived from an ethylene oxide derived compound. Component B may be any one of the following compounds or may be mixturese of these compounds. I have found that hydroxyethyl acetamides and ethoxylated hydroxyethylacetamides are satisfactory of the general formula:

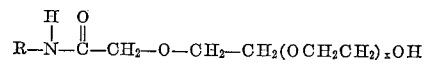

where R represents an alkyl, alkenyl, or alkynl radical containing from 8 to 22 carbon atoms and $x$ may be 0 or a higher integer but is not to exceed one-third the number of carbon atoms contained in R. A greater number of oxyethyl groups upsets the hydrophilic-hydrophobic balance and makes the amide unsuitable for use in this invention. Examples of suitable additives corresponding to the above general formula are N-octyl-β-hydroxyethoxy acetamide, N-dodecyl-β-hydroxyethoxy acetamide, N-eicosyl-β-hydroxyethoxy acetamide, N-decenyl-β-hydroxyethoxy acetamide, N-docosenyl-β-hydroxyethoxy acetamide, N-pentadecenyl-β-hydroxyethoxy acetamide, N-nonyl - β - hydroxyethoxy acetamide, N-heneicosynl-β-hydroxyethoxy acetamide; the one mol ethylene oxide adduct of N-dodecyl-β-hydroxyethoxy acetamide, N-octodecyl-β-hydroxyethoxy acetamide, N-octenyl-β-hydroxyethoxy acetamide, N-tridecenyl-β-hydroxyethoxy acetamide, N-undecynl-β-hydroxyethoxy acetamide, N-nonadecynl-β-hydroxyethoxy acetamide; the two mol ethylene oxide adduct of N-dodecyl-β-hydroxyethoxy acetamide, N-hexadecenyl-β-hydroxyethoxy acetamide, N-nonenyl-β-hydroxyethoxy acetamide, N-eicosenyl - β - hydroxyethoxy acetamide, N-octynl-β-hydroxyethoxy acetamide, N-octodecynl-β-hydroxyethoxy acetamide; the four mol ethylene oxide adduct of N-dodecyl-β-hydroxyethoxy acetamide, N-heptadecyl-β-hydroxyethoxy acetamide, N-tridecenyl-β-hydroxyethoxy acetamide, N-heptadecenyl - β - hydroxyethoxy acetamide, N-dodecynl - β - hydroxyethoxy acetamide, N-pentadecynl-β-hydroxyethoxy acetamide; and the seven mol ethylene oxide adduct of N-heneicosyl-β-hydroxyethoxy acetamide, N-dodosyl-β-hydroxyethoxy acetamide, N-heneicosynl-β-hydroxyethoxy acetamide, N-dodosenyl-β-hydroxyethoxy acetamide, N-heneicosynl-β-hydroxyethoxy acetamide, N - dodosynl-β-hydroxyethoxy acetamide.

The N-alkyl, -alkenyl, or -alkynl-β-hydroxyethoxy acetamide is the condensation product of the reaction between the corresponding primary amine and 2-p-dioxanone. Examples of suitable primary amines are: dodecyl amine, hexadecyl amine, octodecenyl amine, octyl amine, hexadecynl amine, eicosynl amine, decenyl amine, tetradecenyl amine, docosynl amine, and octenyl amine. 2-p-dioxanone is a known chemical made by the catalytic dehydrogenation of diethylene glycol, generally over a copper-chromium catalyst as disclosed in U.S. Patents Nos. 2,142,033 and 2,807,629. The reaction between 2-p-dioxanone and a primary amine proceeds upon the mixing of the two reactants. The reaction product is represented by the general formula:

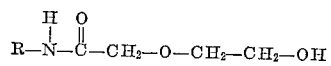

wherein R represents an alkyl, alkenyl, or alkynl radical containing 8 to 22 carbon atoms. The ethoxylated derivatives of the N-alkyl, -alkenyl, or -alkynl-β-hydroxyethoxy-acetamide are prepared by reacting ethylene oxide with the N-alkyl, -alkenyl, or -alkynl-β-hydroxyethoxyacet-amide in the presence of a basic catalyst, such as NaOH, at a temperature of 125° C. and a maximum pressure of 90 p.s.i. The previous disclosure of examples of ethoxylated hydroxyethylacetamides includes compounds named as, for example, the one mol ethylene oxide adduct of N - dodecyl - β - hydroxyethoxyacetamide, which shows that the compounds intended are the reaction product of ethylene oxide and the hydroxyethylacetamide regardless of the specific chemical structure of such compounds. However, the ethylene oxide is believed to add on to the terminal hydroxyl group of the acetamide and the following is believed to represent the general formula of these compounds:

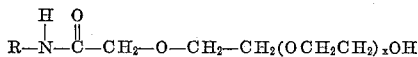

wherein R represents an alkyl, alkenyl, or alkynl radical containing from 8 to 22 carbon atoms and $x$ may be 0 or a higher integer but is not to exceed one-third the number of carbon atoms contained in R.

The nitrogen containing compound in the drilling fluid composition of the present invention may also be any of the ethoxylated amines of the general formula:

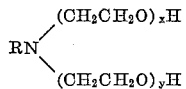

wherein R represents an alkyl, alkenyl or alkynl radical containing 8 to 22 carbon atoms and $x+y$ is an integer of at least 2 but not to exceed one-third the number of carbon atoms contained in R. These compounds are tertiary amines having one fatty R group and two chains of oxyethylene groups attached to the nitrogen. They are the reaction product of an amine and ethylene oxide and are manufactured and sold by Armour and Company under the trade name Ethomeen. Examples of the ethoxylated tertiary amines which have been found to be particularly useful as component B in the emulsifier system of this invention are provided by referring to the previously given general formula and the list of substituents for the formula given below:

| Source of R: | Mols of ethylene oxide ($x+y$) |
|---|---|
| Octyl amine | 2 |
| Dodecyl amine | 4 |
| Hexadecyl amine | 5 |
| Decenyl amine | 3 |
| Eicosenyl amine | 2 |
| Dodosynl amine | 7 |
| Nonynl amine | 2 |
| Coco amine | 2 |
| Soybean amine | 2 |
| Soybean amine | 5 |
| Tallow amine | 2 |
| Tallow amine | 5 |
| Stearyl amine | 5 |
| Stearyl amine | 2 |

Another class of nitrogen containing compounds used in the emulsifier system of the present invention is the ethoxylated diamines of the general formula:

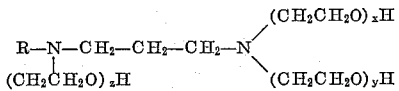

wherein R represents an alkyl, alkenyl or alkynl radical containing 9 to 22 carbon atoms and the total of $x+y+z$ is an integer of at least 3 but not to exceed one-third the number of carbon atoms contained in R. The compounds are diamines having one fatty R group and the three active hydrogens on the nitrogens replaced with chains of oxyethylene groups. They are the reaction product of N-alkyl, -alkenyl, -alkynl trimethylene diamine and ethylene oxide and are manufactured and sold by Armour and Company under the trade name Ethoduomeen. Examples of the ethoxylated diamine compounds are provided by reference to the previously given general formula and the following list of substituents for the general formula:

| Source of R: | Mols of ethylene oxide ($x+y+z$) |
|---|---|
| Nonyl amine | 3 |
| Eicosyn amine | 4 |
| Decenyl amine | 3 |
| Heneicosenyl amine | 5 |
| Tridecynl amine | 4 |
| Dodosynl amine | 6 |
| Coco amine | 3 |
| Tallow amine | 3 |
| Oleyl amine | 3 |

Additional nitrogen containing compounds which are suitable for use in the composition of the present invention are the sarcosinamides and ethoxylated sarcosinamides of the general formulae:

(a)
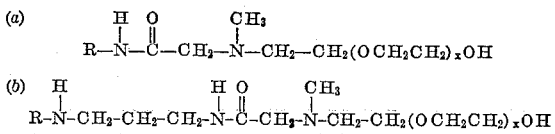

(b)

wherein R represents an alkyl, alkenyl, or alkynl radical containing 8 to 22 carbon atoms and $x$ may be 0 or an integer not to exceed one-third the number of carbon atoms contained in R. The sarcosinamides are the condensation products of the reaction between the corresponding primary amine and 4-methyl-2-morpholone. 4-methyl-2-morpholone is a known chemical made by heating ethylene oxide with the amino acid, sarcosine, at 80–90° C. for 24 hours, followed by removal of water from the intermediate N-ethanolamino acid. The 4-methyl-2-morpholone is reacted with a fatty primary amine such as octyl amine, dodecyl amine, hexadecyl amine, stearyl amine, dodosyl amine, nonenyl amine, eicosenyl amine, undecenyl amine, heneicosynl amine, tallow amine, coco amine, and soybean amine, or a fatty trimethylenediamine such as N-octyl trimethylenediamine, N-hexadecyl trimethylenediamine, N-dodosyl trimethylenediamine, N-decenyl trimethylenediamine, N-heneicosenyl trimethylenediamine, N-dodecynl trimethylenediamine, N-eicosynl trimethylenediamine, N-coco trimethylenediamine, N-soybean trimethylenediamine, N-tallow trimethylenediamine and N-stearyl trimethylenediamine at 100° C. for 2 hours to produce the sarcosinamide of the following formulae:

(1)
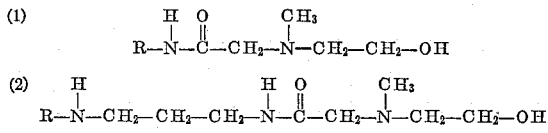

(2)

wherein R represents an alkyl, alkenyl, or alkynl radical containing 8 to 22 carbon atoms.

The hydroxyethylsarcosinamides may be ethoxylated by the procedure outlined for the ethoxylation of N-alkyl, -alkenyl or -alkynl-β-hydroxyethoxy acetamides. The product of ethoxylation may be represented by the general formulae:

(a)
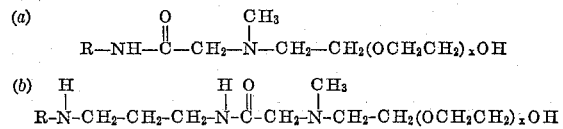

(b)

wherein R represents an alkyl, alkenyl, or alkynl radical containing 8 to 22 carbon atoms and x is 0 where the sarcosinamide is not ethoxylated or an integer not to exceed one-third the number of carbon atoms contained in R where the sarcosinamide is ethoxylated. Examples of these sarcosinamides and the ethoxylated sarcosinamides are provided by reference to Formula *a* and the following list of substituents for Formula *a*:

| Source of R: | Mols of ethylene oxide $x$ |
|---|---|
| Octyl amine | 0 |
| Dodecyl amine | 0 |
| Hexadecyl amine | 2 |
| Decenyl amine | 1 |
| Dodosenyl amine | 7 |
| Undecynl amine | 1 |
| Heneicosynl | 6 |
| Tallow amine | 2 |
| Coco amine | 5 |
| Stearyl amine | 3 |
| Tallow amine | 0 |
| Coco amine | 0 |
| Stearyl amine | 0 |
| Dodecyl amine | 1 |
| Hexadecyl amine | 0 |

Further examples of the sarcosinamides and ethoxylated sarcosinamides are provided by reference to Formula *b* and the following list of substituents for Formula *b*:

| Source of R: | Mols of Ethylene oxide $x$ |
|---|---|
| Octyl amine | 1 |
| Dodosyl amine | 2 |
| Nonenyl amine | 3 |
| Heneicosenyl amine | 6 |
| Decenyl amine | 1 |
| Nonadecynl amine | 4 |
| Coco amine | 0 |
| Coco amine | 2 |
| Tallow amine | 0 |
| Tallow amine | 5 |

The concentration of the emulsifier system composed of component A and component B should be within the range of 0.1 to 10 parts by weight on the basis of 100 parts by weight of drilling fluid and preferably within the range 0.1 to 5 parts by weight. A very low emulsifier concentration is necessary to produce the invert emulsion drilling fluid, however the ranges allow an excess which can be used to compensate for dilution. Therefore the upper limit of the wide range will allow considerable dilution while the upper limit of the narrow range will compensate for some dilution and is a more economical range.

The invert emulsion drilling fluid of this invention is prepared by first making an intimate mixture of component A and component B. This will require melting one or both of the components of the emulsifying agent if they are solids. The intimate mixture either in the liquid or solid state is then dissolved in the oil. The concentration of the acid in the emulsifier composition is adjusted to keep the pH of the drilling fluid within the range 5 to 8 since the emulsion tends to break when a pH outside of this range ocurs. An equimolar amount of component A and component B may be used. The relative proportions of components A and B can be varied widely subject only to the pH limitation. The resulting emulsifier-oil solution should then be mixed with the appropriate amount of water necessary to obtain a drilling fluid having the desired viscosity. The viscosity of the fluid can be adjusted by increasing the concentration of the oil phase or the water phase. The emulsion formed is stable.

The following examples are presented to particularly illustrate the invention but should not be used to limit, unduly, the scope of the invention.

*Example 1*

A water-in-oil emulsion drilling fluid was prepared according to the following composition:

| | Percent by weight |
|---|---|
| Kerosene | 10 |
| Emulsifying agent | 0.6 |
| Water | 89.4 |

The two components of the emulsifying agent were heated to the melting point of the solid component and intimately mixed. The emulsifying agent was dissolved in the kerosene and the water was added gradually while mixing to obtain an invert emulsion drilling fluid.

The emulsifying agent comprised equimolar quantities of oleic acid and N-n-dodecyl-β-hydroxyethoxyacetamide and produced a drilling fluid having a Fann viscosity of greater than 300 cps. at 600 r.p.m. and a milky color. The emulsion was found to be stable after standing at room temperature for one week.

*Example 2*

A water-in-oil emulsion drilling fluid was prepared according to Example 1 except the emulsifying agent comprised equimolar quantities of oleic acid and the two mol ethylene oxide adduct of N-n-dodecyl-β-hydroxyethoxyacetamide.

The drilling fluid produced had a Fann viscosity greater than 300 cps. at 600 r.p.m. and a milky color. The emulsion was found to be stable after standing at room temperature for one week.

*Example 3*

A water-in-oil emulsion drilling fluid was prepared according to Example 1 except the emulsifying agent comprised equimolar quaitities of oleic acid and a compound of the formula:

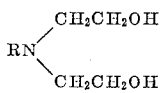

wherein R is a fatty radical derived from coconut oil.

The drilling fluid produced had a Fann viscosity greater than 300 cps. at 600 r.p.m. and a milky color. The emulsion was found to be stable after standing at room temperature for one week.

*Example 4*

A water-in-oil emulsion drilling fluid was prepared according to Example 1 except the emulsifying agent comprised equimolar quantities of oleic acid and a compound of the formula:

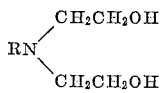

wherein R is a fatty radical derived from soybean oil.

The drilling fluid produced had a Fann viscosity greater than 300 cps. at 600 r.p.m. and a milky color. The emulsion was found to be stable after standing at room temperature for one week.

*Example 5*

A water-in-oil emulsion drilling fluid was prepared according to Example 1 except the emulsifying agent comprised equimolar quantities of oleic acid and a compound of the formula:

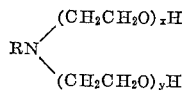

wherein R is a fatty radical derived from soybean oil and $x+y$ is 5.

The drilling fluid produced had a Fann viscosity greater than 300 cps. at 600 r.p.m. and a milky color. The emul-

Example 6

A water-in-oil emulsion drilling fluid was prepared according to Example 1 except the emulsifying agent comprised equimolar quantities of oleic acid and a compound of the formula:

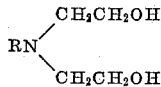

wherein R is a fatty radical derived from tallow.

The drilling fluid produced had a Fann viscosity greater than 300 cps. at 600 r.p.m. and a milky color. The emulsion was found to be stable after standing at room temperature for one week.

Example 7

A water-in-oil emulsion drilling fluid was prepared according to Example 1 except the emulsifying agent comprised equimolar quantities of oleic acid and a compound of the formula:

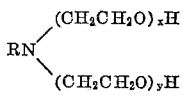

wherein R is a fatty radical derived from tallow and $x+y$ is 5.

The drilling fluid produced had a Fann viscosity greater than 300 cps. at 600 r.p.m. and a milky color. The emulsion was found to be stable after standing at room temperature for one week.

Example 8

A water-in-oil emulsion drilling fluid was prepared according to Example 1 except the emulsifying agent comprised equimolar quantities of oleic acid and a compound of the formula:

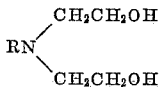

wherein R is stearyl.

The drilling fluid produced had a Fann viscosity greater than 300 cps. at 600 r.p.m. and a milky color. The emulsion was found to be stable after standing at room temperature for one week.

Example 9

A water-in-oil emulsion drilling fluid was prepared according to Example 1 except the emulsifying agent comprised equimolar quantities of oleic acid and a compound of the formula:

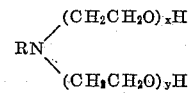

wherein R is stearyl and $x+y$ is 5.

The drilling fluid produced had a Fann viscosity greater than 300 cps. at 600 r.p.m. and a milky color. The emulsion was found to be stable after standing at room temperature for one week.

Example 10

A water-in-oil emulsion drilling fluid was prepared according to Example 1 except the emulsifying agent comprised equimolar quantities of oleic acid and a compound of the formula:

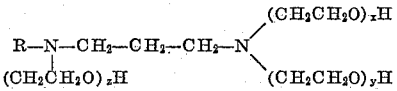

wherein R is oleyl and $x+y+z$ is 3.

The drilling fluid produced had a Fann viscosity greater than 300 cps. at 600 r.p.m. and a milky color. The emulsion was found to be stable after standing at room temperature for one week.

Example 11

A water-in-oil emulsion drilling fluid was prepared according to Example 1 except the emulsifying agent comprised equimolar quantities of oleic acid and a compound of the formula:

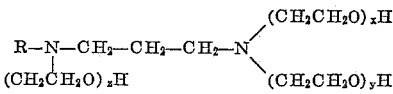

wherein R is a fatty radical derived from tallow and $x+y+z$ is 3.

The drilling fluid produced had a Fann viscosity greater than 300 cps. at 600 r.p.m. and a milky color. The emulsion was found to be stable after standing at room temperature for one week.

Example 12

A water-in-oil emulsion drilling fluid was prepared according to Example 1 except the emulsifying agent comprised equimolar quaitities of oleic acid and a sarcosinamide of the formula:

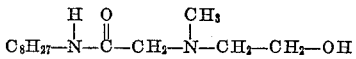

The drilling fluid produced had a Fann viscosity greater than 300 cps. at 600 r.p.m. and a milky color. The emulsion was found to be stable after standing at room temperature for one week.

Example 13

A water-in-oil emulsion drilling fluid was prepared according to Example 1 except the emulsifying agent comprised equimolar quantities of oleic acid and a sarcosinamide of the formula:

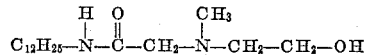

The drilling fluid produced had a Fann viscosity greater than 300 cps. at 600 r.p.m. and a milky color. The emulsion was found to be stable after standing at room temperature for one week.

Example 14

A water-in-oil emulsion drilling fluid was prepared according to Example 1 except the emulsifying agent comprised equimolar quantities of oleic acid and a sarcosinamide of the formula:

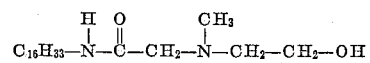

The drilling fluid produced had a Fann viscosity greater than 300 cps. at 600 r.p.m. and a milky color. The emulsion was found to be stable after standing at room temperature for one week.

Example 15

A water-in-oil emulsion drilling fluid was prepared according to Example 1 except the emulsifying agent comprised equimolar quantities of oleic acid and a sarcosinamide of the formula:

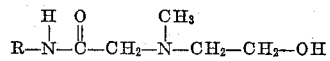

wherein R is derived from tallow amine.

The drilling fluid produced had a Fann viscosity greater than 300 cps. at 600 r.p.m. and a milky color. The emulsion was found to be stable after standing at room temperature for one week.

Example 16

A water-in-oil emulsion drilling fluid was prepared according to Example 1 except the emulsifying agent comprised equimolar quantities of oleic acid and a sarcosinamide of the formula:

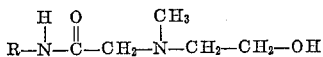

wherein R is derived from distilled grade soybean amine.

The drilling fluid produced had a Fann viscosity greater than 300 cps. at 600 r.p.m. and a milky color. The emulsion was found to be stable after standing at room temperature for one week.

*Example 17*

A water-in-oil emulsion drilling fluid was prepared according to Example 1 except the emulsifying agent comprised equimolar quantities of oleic acid and a sarcosinamide of the formula:

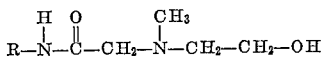

wherein R is derived from coco amine.

The drilling fluid produced had a Fann viscosity greater than 300 cps. at 600 r.p.m. and a milky color. The emulsion was found to be stable after standing at room temperature for one week.

*Example 18*

A water-in-oil emulsion drilling fluid was prepared according to Example 1 except the emulsifying agent comprised equimolar quantities of oleic acid and a sarcosinamide of the formula:

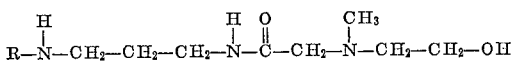

wherein R is derived from coco amine.

The drilling fluid produced had a Fann viscosity greater than 300 cps. at 600 r.p.m. and a milky color. The emulsion was found to be stable after standing at room temperature for one week.

*Example 19*

A water-in-oil emulsion drilling fluid was prepared according to Example 1 except the emulsifying agent comprised equimolar quantities of oleic acid and a sarcosinamide of the formula:

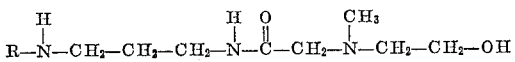

wherein R is derived from tallow amine.

The drilling fluid produced had a Fann viscosity greater than 300 cps. at 600 r.p.m. and a milky color. The emulsion was found to be stable after standing at room temperature for one week.

*Example 20*

A water-in-oil emulsion drilling fluid was prepared according to Example 1 except the emulsifying agent comprised equimolar quantities of stearic acid and N-n-dodecyl-β-hydroxy-ethoxyacetamide.

The drilling fluid produced had a Fann viscosity greater than 300 cps. at 600 r.p.m. and a milky color. The emulsion was found to be stable after standing at room temperature for one week.

*Example 21*

A water-in-oil emulsion drilling fluid was prepared according to Example 1 except the emulsifying agent comprised equimolar quantities of acetic acid and N-n-dodecyl-β-hydroxy-ethoxyacetamide.

The drilling fluid produced had a Fann viscosity greater than 300 cps. at 600 r.p.m. and a milky color. The emulsion was found to be stable after standing at room temperature for one week.

*Example 22*

A water-in-oil emulsion drilling fluid was prepared according to Example 1 except the emulsifying agent comprised equimolar quantities of adipic acid and N-n-dodecyl-β-hydroxyethoxyacetamide.

The drilling fluid produced had a Fann viscosity greater than 300 cps. at 600 r.p.m. and a milky color. The emulsion was found to be stable after standing at room temperature for one week.

*Example 23*

A water-in-oil emulsion drilling fluid was prepared according to Example 1 except the emulsifying agent comprised equimolar quantities of p-toluenesulfonic acid and N-n-dodecyl-β-hydroxyethoxyacetamide.

The drilling fluid produced had a Fann viscosity greater than 300 cps. at 600 r.p.m. and a milky color. The emulsion was found to be stable after standing at room temperature for one week.

*Example 24*

A water-in-oil emulsion drilling fluid was prepared according to Example 1 except the emulsifying agent comprised equimolar quantities of boric acid and N-n-dodecyl-β-hydroxyethoxyacetamide.

The drilling fluid produced had a Fann viscosity greater than 300 cps. at 600 r.p.m. and a milky color. The emulsion was found to be stable after standing at room temperature for one week.

*Example 25*

A water-in-oil emulsion drilling fluid was prepared according to Example 1 except the emulsifying agent comprised equimolar quantities of stearic acid and a compound of the formula:

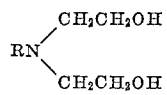

wherein R is a fatty radical derived from coconut oil.

The drilling fluid produced had a Fann viscosity greater than 300 cps. at 600 r.p.m. and a milky color. The emulsion was found to be stable after standing at room temperature for one week.

*Example 26*

A water-in-oil emulsion drilling fluid was prepared according to Example 1 except the emulsifying agent comprised equimolar quantities of acetic acid and a compound of the formula:

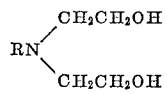

wherein R is a fatty radical derived from coconut oil.

The drilling fluid produced had a Fann viscosity greater than 300 cps. at 600 r.p.m. and a milky color. The emulsion was found to be stable after standing at room temperature for one week.

*Example 27*

A water-in-oil emulsion drilling fluid was prepared according to Example 1 except the emulsifying agent comprised equimolar quantities of adipic acid and a compound of the formula:

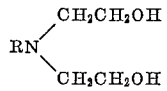

wherein R is a fatty radical derived from coconut oil.

The drilling fluid produced had a Fann viscosity greater than 300 cps. at 600 r.p.m. and a milky color. The emulsion was found to be stable after standing at room temperature for one week.

*Example 28*

A water-in-oil emulsion drilling fluid was prepared according to Example 1 except the emulsifying agent comprised equimolar quantities of p-toluenesulfonic acid and a compound of the formula:

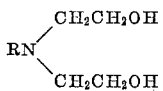

wherein R is a fatty radical derived from coconut oil.

The drilling fluid produced had a Fann viscosity greater than 300 cps. at 600 r.p.m. and a milky color. The emulsion was found to be stable after standing at room temperature for one week.

*Example 29*

A water-in-oil emulsion drilling fluid was prepared according to Example 1 except the emulsifying agent comprised equimolar quantities of boric acid and a compound of the formula:

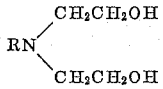

wherein R is a fatty radical derived from coconut oil.

The drilling fluid produced had a Fann viscosity greater than 300 cps. at 600 r.p.m. and a milky color. The emulsion was found to be stable after standing at room temperature for one week.

What is claimed is:

1. A stable water-in-oil emulsion drilling fluid having a pH in the range of 5 to 8 comprising, on a basis of 100 parts by weight of drilling fluid from about 70 to about 95 parts by weight of water, from about 5 to about 30 parts by weight of oil and from about 0.1 to about 10 parts by weight of an emulsifying agent comprising component A and component B wherein component A is an acid selected from the group consisting of monocarboxyl alkanoic, monocarboxyl alkenoic and monocarboxyl alkynoic fatty acids containing 2 to 22 carbon atoms, adipic acid, aliphatic sulfonic acids and alkyl aryl sulfonic acids and boric acid, and mixtures thereof and component B is a member selected from the group consisting of:

(1) hydroxyethyl acetamides and ethoxylated hydroxyethyl acetamides and mixtures thereof of the general formula

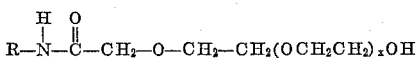

wherein R is a member selected from the group consisting of alkyl, alkenyl and alkynl radicals containing from 8 to 22 carbon atoms and $x$ is in the range of 0 to an integer not to exceed one-third the number of carbon atoms contained in R, inclusive;

(2) ethoxylated amines and mixtures thereof of the general formula

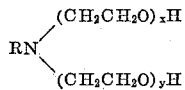

wherein R is a member selected from the group consisting of alkyl, alkenyl and alkynl radicals containing from 8 to 22 carbon atoms and wherein the total of $x+y$ is an integer of at least 2 and not to exceed one-third the number of carbon atoms contained in R;

(3) ethoxylated diamines and mixtures thereof of the general formula

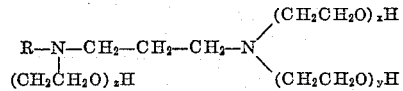

wherein R is a member selected from the group consisting of alkyl, alkenyl and alkynl radicals containing from 9 to 22 carbon atoms and wherein the total of $x+y+z$ is an integer of at least 3 and not to exceed one-third the number of carbon atoms contained in R;

(4) sarcosinamides and ethoxylated sarcosinamides and mixtures thereof of the general formula

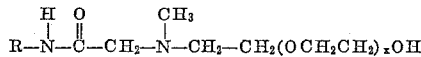

wherein R is a member selected from the group consisting of alkyl, alkenyl and alkynl radicals containing from 8 to 22 carbon atoms and $x$ is in the range of 0 to an integer not to exceed one-third the number of carbon atoms contained in R, inclusive; and (5) sarcosinamides and ethoxylated sarcosinamides and mixtures thereof of the general formula

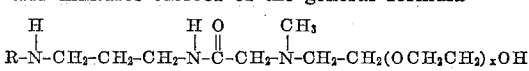

wherein R is a member selected from the group consisting of alkyl, alkenyl and alkynl radicals containing from 8 to 22 carbon atoms and x is in the range of 0 to an integer not to exceed one-third the number of carbon atoms contained in R, inclusive, and mixtures thereof.

2. A stable water-in-oil emulsion drilling fluid as in claim 1 comprising from about 80 to 90 parts by weight of water, from about 10 to 20 parts by weight of oil, and from about 0.1 to 5 parts by weight of said emulsifying agent.

3. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is oleic acid and component B is of the formula:

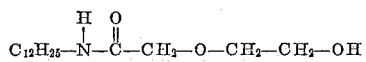

4. A stable water-in-oil emulsion drilling fluid having a pH in the range of 5 to 8 comprising on a basis of 100 parts by weight of drilling fluid from about 70 to about 95 parts by weight of water, from about 5 to about 30 parts by weight of oil and from about 0.1 to about 10 parts by weight of an emulsifying agent comprising component A and component B wherein component A is oleic acid and component B is of the formula:

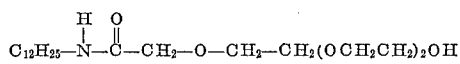

5. A stable water-in-oil emulsion drilling fluid having a pH in the range of 5 to 8 comprising on a basis of 100 parts by weight of drilling fluid from about 70 to about 95 parts by weight of water, from about 5 to about 30 parts by weight of oil and from about 0.1 to about 10 parts by weight of an emulsifying agent comprising component A and component B wherein component A is stearic acid and component B is of the formula:

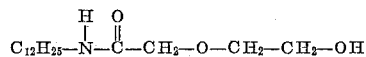

6. A stable water-in-oil emulsion drilling fluid having a pH in the range of 5 to 8 comprising on a basis of 100 parts by weight of drilling fluid from about 70 to about 95 parts by weight of water, from about 5 to about 30 parts by weight of oil and from about 0.1 to about 10 parts by weight of an emulsifying agent comprising component A and component B wherein component A is stearic acid and component B is of the formula:

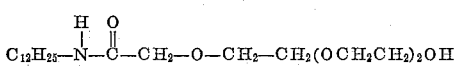

7. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is oleic acid and component B is of the formula:

$$RN\begin{matrix}CH_2-CH_2-OH\\ \\ CH_2-CH_2-OH\end{matrix}$$

wherein R is a fatty radical derived from coconut oil.

8. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of emulsifying agent comprising component A and component B wherein component A is oleic acid and component B is of the formula:

$$RN\begin{matrix}CH_2-CH_2-OH\\ \\ CH_2-CH_2-OH\end{matrix}$$

wherein R is a fatty radical derived from soybean oil.

9. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is oleic acid and component B is of the formula:

$$RN\begin{matrix}(CH_2CH_2O)_xH\\ \\ (CH_2CH_2O)_yH\end{matrix}$$

wherein R is a fatty radical derived from soybean oil and $x+y$ is 5.

10. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is oleic acid and component B is of the formula:

$$RN\begin{matrix}CH_2-CH_2-OH\\ \\ CH_2-CH_2-OH\end{matrix}$$

wherein R is a fatty radical derived from tallow.

11. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is oleic acid and component B is of the formula:

$$RN\begin{matrix}(CH_2CH_2O)_xH\\ \\ (CH_2CH_2O)_yH\end{matrix}$$

wherein R is a fatty radical derived from tallow and $x+y$ is 5.

12. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is oleic acid and component B is of the formula:

$$R-N\begin{matrix}&(CH_2CH_2O)_xH\\-CH_2-CH_2-CH_2-N&\\(CH_2CH_2O)_zH&(CH_2CH_2O)_yH\end{matrix}$$

wherein R is oleyl and $x+y+z$ is 3.

13. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is oleic acid and component B is of the formula:

$$R-N\begin{matrix}&(CH_2CH_2O)_xH\\-CH_2-CH_2-CH_2-N&\\(CH_2CH_2O)_zH&(CH_2CH_2O)_yH\end{matrix}$$

wherein R is a fatty radical derived from tallow and $x+y+z$ is 3.

14. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is stearic acid and component B is of the formula:

$$R-N\begin{matrix}&(CH_2CH_2O)_xH\\-CH_2-CH_2-CH_2-N&\\(CH_2CH_2O)_zH&(CH_2CH_2O)_yH\end{matrix}$$

wherein R is oleyl and $x+y+z$ is 3.

15. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is stearic acid and component B is of the formula:

$$R-N\begin{matrix}&(CH_2CH_2O)_xH\\-CH_2-CH_2-CH_2-N&\\(CH_2CH_2O)_zH&(CH_2CH_2O)_yH\end{matrix}$$

wherein R is a fatty radical derived from tallow and $x+y+z$ is 3.

16. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is oleic acid and component B is of the formula:

$$C_8H_{17}-\overset{H}{\underset{}{N}}-\overset{O}{\underset{}{C}}-CH_2-\overset{CH_3}{\underset{}{N}}-CH_2-CH_2-OH$$

17. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is oleic acid and component B is of the formula:

$$C_{12}H_{25}-\overset{H}{\underset{}{N}}-\overset{O}{\underset{}{C}}-CH_2-\overset{CH_3}{\underset{}{N}}-CH_2-CH_2-OH$$

18. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is oleic acid and component B is of the formula:

$$C_{16}H_{33}-\underset{H}{N}-\underset{O}{\overset{\|}{C}}-CH_2-\underset{CH_3}{N}-CH_2-CH_2-OH$$

19. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is oleic acid and component B is of the formula:

$$R-\underset{H}{N}-\underset{O}{\overset{\|}{C}}-CH_2-\underset{CH_3}{N}-CH_2-CH_2-OH$$

wherein R is a fatty radical derived from tallow.

20. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is oleic acid and component B is of the formula:

$$R-\underset{H}{N}-\underset{O}{\overset{\|}{C}}-CH_2-\underset{CH_3}{N}-CH_2-CH_2-OH$$

wherein R is stearyl.

21. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is oleic acid and component B is of the formula:

$$R-\underset{H}{N}-\underset{O}{\overset{\|}{C}}-CH_2-\underset{CH_3}{N}-CH_2-CH_2-OH$$

wherein R is a fatty radical derived from coconut oil.

22. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is oleic acid and component B is of the formula:

$$R-\underset{H}{N}-CH_2-CH_2-CH_2-\underset{H}{N}-\underset{O}{\overset{\|}{C}}-CH_2-\underset{CH_3}{N}-CH_2-CH_2-OH$$

wherein R is a fatty radical derived from coconut oil.

23. A stable water-in-oil emulsion drilling fluid having a pH in the range of 5 to 8 comprising on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is oleic acid and component B is of the formula:

$$R-\underset{H}{N}-CH_2-CH_2-CH_2-\underset{H}{N}-\underset{O}{\overset{\|}{C}}-CH_2-\underset{CH_3}{N}-CH_2-CH_2-OH$$

wherein R is a fatty radical derived from tallow.

24. A method for preparing a stable water-in-oil emulsion drilling fluid comprising dissolving the emulsifying agent comprised of an intimate mixture of component A and component B of claim 1 in oil, adding water and emulsifying said oil and water by mixing to obtain a drilling fluid having a pH in the range 5 to 8 comprising on a basis of 100 parts by weight of drilling fluid, from about 70 to about 95 parts by weight of water, from about 5 to about 30 parts by weight of oil and from about 0.1 to about 10 parts by weight of emulsifying agent.

25. In a method of drilling a well, the improvement which comprises circulating in said well a stable water-in-oil emulsion drilling fluid having a pH in the range of 5 to 8 comprising, on a basis of 100 parts by weight of drilling fluid, from about 70 to about 95 parts by weight of water, from about 5 to about 30 parts by weight of oil and from about 0.1 to about 10 parts by weight of an emulsifying agent comprising component A and component B wherein component A is an acid selected from the group consisting of monocarboxyl alkanoic, monocarboxyl alkenoic and monocarboxyl alkynoic fatty acids containing 2 to 22 carbon atoms, adipic acid, aliphatic sulfonic acids and alkyl aryl sulfonic acids and boric acid and mixtures thereof and component B is a member selected from the group consisting of:

(1) hydroxyethyl acetamides and ethoxylated hydroxyethyl acetamides and mixtures thereof of the general formula $$R-\underset{H}{N}-\underset{O}{\overset{\|}{C}}-CH_2-O-CH_2-CH_2(OCH_2CH_2)_xOH$$

wherein R is a member selected from the group consisting of alkyl, alkenyl and alkynl radicals containing from 8 to 22 carbon atoms and $x$ is in the range of 0 to an integer not to exceed one-third the number of carbon atoms contained in R, inclusive;

(2) ethoxylated amines and mixtures thereof of the general formula $$RN\begin{smallmatrix}(CH_2CH_2O)_xH \\ (CH_2CH_2O)_yH\end{smallmatrix}$$

wherein R is a member selected from the group consisting of alkyl, alkenyl and alkynl radicals containing from 8 to 22 carbon atoms and wherein the total of $x+y$ is an integer of at least 2 and not to exceed one-third the number of carbon atoms contained in R;

(3) ethoxylated diamines and mixtures thereof of the general formula $$R-\underset{(CH_2CH_2O)_zH}{N}-CH_2-CH_2-CH_2-N\begin{smallmatrix}(CH_2CH_2O)_xH \\ (CH_2CH_2O)_yH\end{smallmatrix}$$

wherein R is a member selected from the group consisting of alkyl, alkenyl and alkynl radicals containing from 8 to 22 carbon atoms and wherein the total of $x+y+z$ is an integer of at least 3 and not to exceed one-third the number of carbon atoms contained in R;

(4) sarcosinamides and ethoxylated sarcosinamides and mixtures thereof the general formula $$R-\underset{H}{N}-\underset{O}{\overset{\|}{C}}-CH_2-\underset{CH_3}{N}-CH_2-CH_2(OCH_2CH_2)_xOH$$

wherein R is a member selected from the group consisting of alkyl, alkenyl and alkynl radicals containing from 8 to 22 carbon atoms and $x$ is in the range of 0 to an integer not to exceed one-third the number of carbon atoms contained in R, inclusive; and (5) sarcosinamides and ethoxylated sarcosinamides and mixtures thereof of the general formula $$R-\underset{H}{N}-CH_2-CH_2-CH_2-\underset{H}{N}-\underset{O}{\overset{\|}{C}}-CH_2-\underset{CH_3}{N}-CH_2-CH_2(OCH_2CH_2)_xOH$$

wherein R is a member selected from the group consisting of alkyl, alkenyl and alkynl radicals containing from 8 to 22 carbon atoms and $x$ is in the range of 0 to an integer not to exceed one-third the number of carbon atoms contained in R, inclusive, and mixtures thereof.

References Cited in the file of this patent

UNITED STATES PATENTS

| | | |
|---|---|---|
| 2,661,334 | Lummus | Dec. 1, 1953 |
| 2,802,531 | Cardwell et al. | Aug. 13, 1957 |
| 2,857,330 | Hall | Oct. 21, 1958 |
| 2,876,197 | Watkins | Mar. 3, 1959 |
| 2,965,566 | Hoeppel | Dec. 20, 1960 |

OTHER REFERENCES

Ethomeens, Ethomids and Ethofats, pub. by Armour Chemical Division, Chicago, 1949, pages 1, 3, 18, 19 and 20.

UNITED STATES PATENT OFFICE
CERTIFICATE OF CORRECTION

Patent No. 3,125,517            March 17, 1964

Ronald L. Voda

It is hereby certified that error appears in the above numbered patent requiring correction and that the said Letters Patent should read as corrected below.

Column 4, line 14, for "mixturese" read -- mixtures --; column 9, line 60, for "flpid" read -- fluid --; column 10, lines 27 and 28, for the left-hand portion of the formula reading:

$$C_8H_{27}- \qquad \text{read} \qquad C_8H_{17}-$$

column 11, lines 57 and 67, for "-hydroxy-ethoxyacetamide" read -- -hydroxyethoxyacetamide --; column 16, lines 4 to 6, for the lower right-hand portion of the formula reading:

$$-(CH_2CH_2O)_vH \qquad \text{read} \qquad -(CH_2CH_2O)_yH$$

column 18, line 58, after "thereof" insert -- of --.

Signed and sealed this 4th day of May 1965.

(SEAL)
Attest:

ERNEST W. SWIDER
Attesting Officer

EDWARD J. BRENNER
Commissioner of Patents